April 16, 1940.   E. G. KIMMICH   2,197,569
METHOD FOR MAKING BELTS
Filed Dec. 22, 1934   2 Sheets-Sheet 1
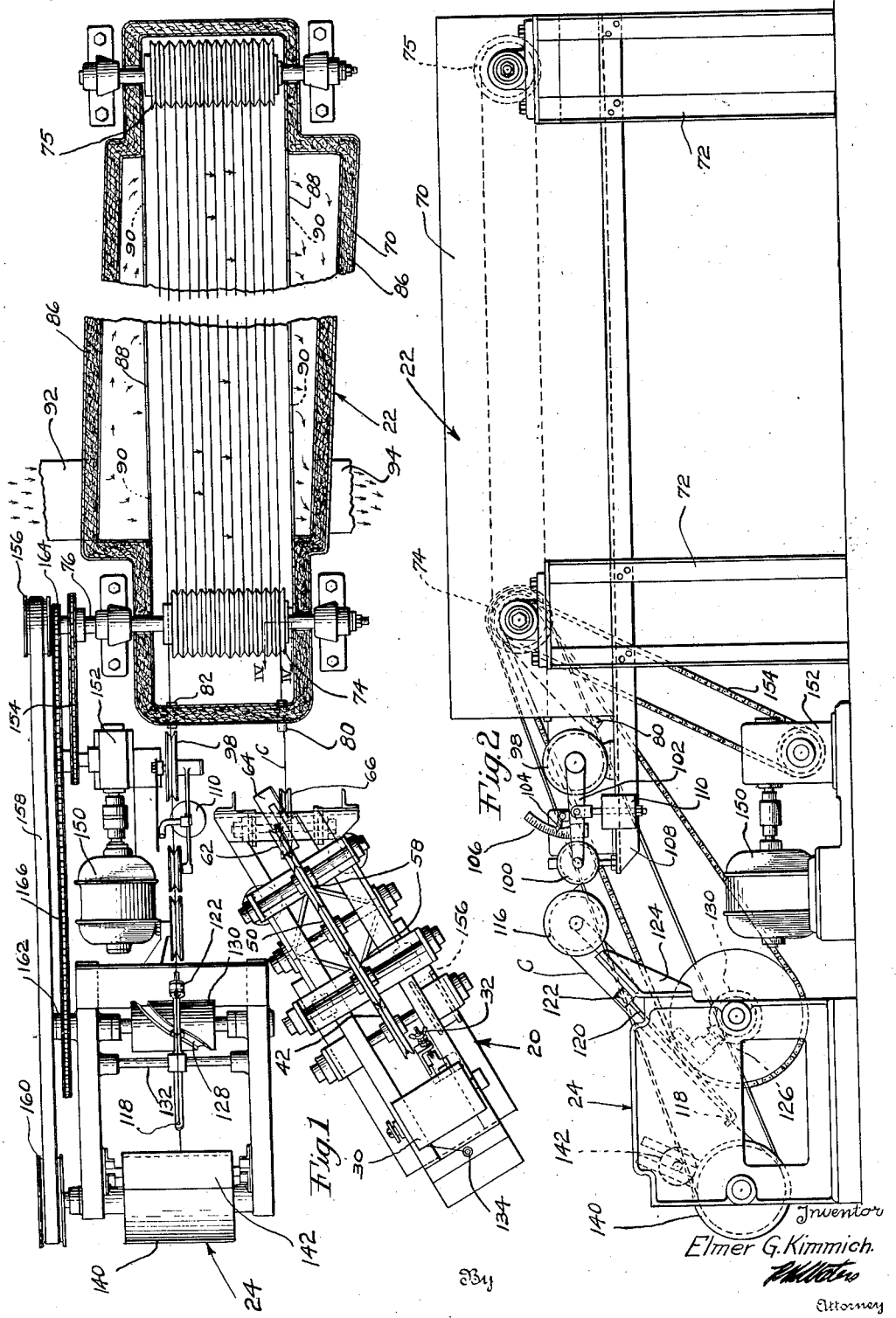
Inventor
Elmer G. Kimmich.

April 16, 1940. E. G. KIMMICH 2,197,569
METHOD FOR MAKING BELTS
Filed Dec. 22, 1934 2 Sheets-Sheet 2
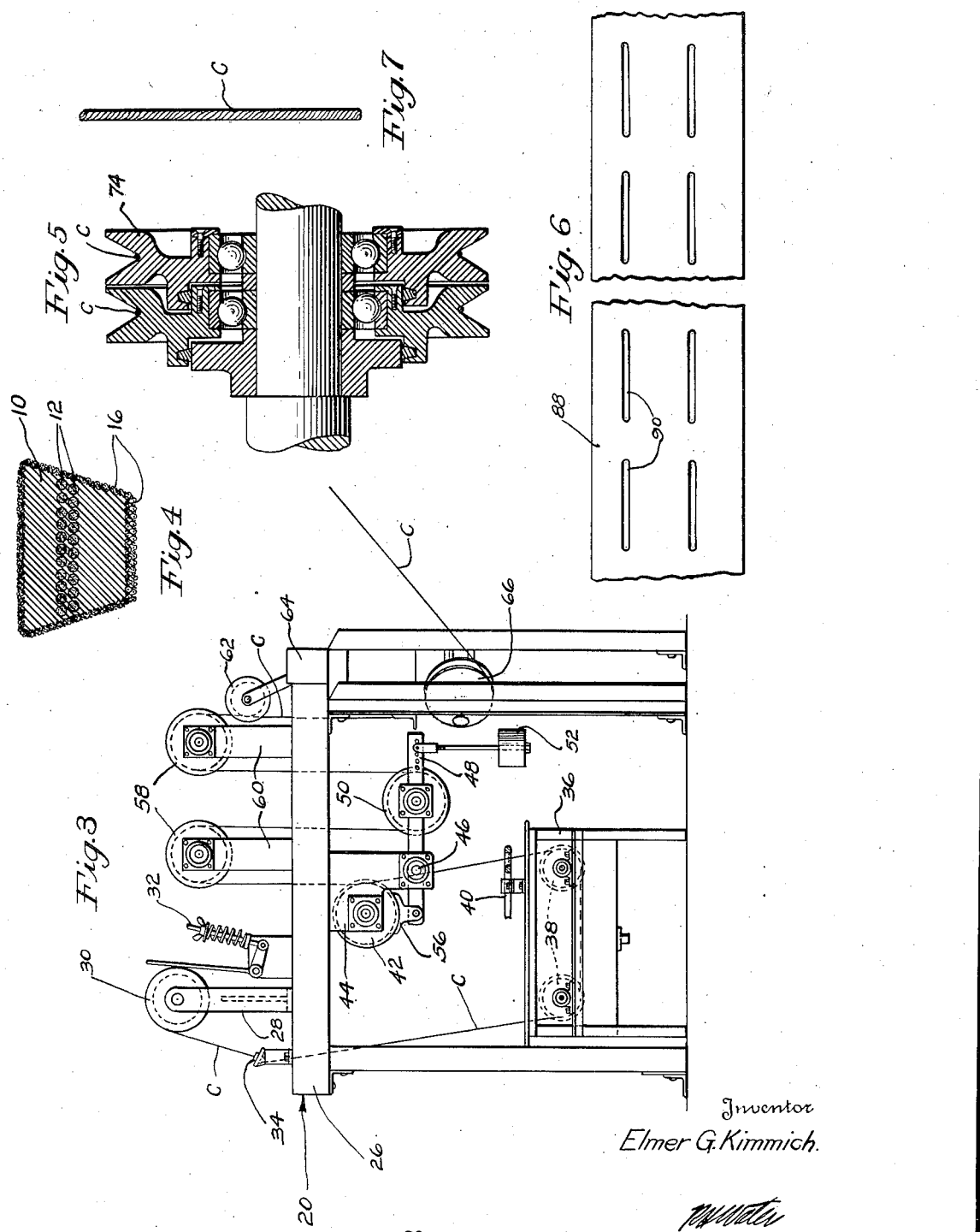
Inventor
Elmer G. Kimmich.
By
Attorney Patented Apr. 16, 1940

2,197,569

UNITED STATES PATENT OFFICE 2,197,569

METHOD FOR MAKING BELTS

Elmer G. Kimmich, Akron, Ohio, assignor to Wingfoot Corporation, Wilmington, Del., a corporation of Delaware Application December 22, 1934, Serial No. 758,869

6 Claims. (Cl. 154—4)

This invention relates to flexible rubberized belts and to treated cords therefor and to methods particularly designed for producing the improved cords and belts.

It is well known to make belts of rubber strengthened by fabric. It has, however, been found that the use of the usual rubberized fabric does not adapt itself entirely to the manufacture of belts due to the tension and compression forces on the fabric as caused by high flexing to which the belts are ordinarily subjected when in use and, for example, moving around pulleys of small radii. It has, accordingly, been proposed to make a belt with a rubber body reinforced at a substantially central or the so-called neutral plane only, with one or more strands or layers of strength-carrying cords which are adapted to transmit the driving forces of the belt. Above and below the plane of reinforcing cords the belt body is adapted to be placed under compression or tension without causing rupture of the belt. The belt body may, if desired, be coated or wrapped with rubberized fabric which functions as an envelope to protect the belt and obtain a better driving contact.

In the past with the various forms of belts heretofore described some difficulty has been experienced due to the belts stretching even when reinforced with a circumferentially wound cord placed in the belt. Stretching of the reinforcing cords and thus the belt necessitates employing adjusting or takeup means on the belt mounting and still further has been found to reduce belt life by permitting slippage and wear in belts.

In order to reduce belt stretch it has been proposed to make tighter and stronger threads and cords by twisting the same when wet, however it has been found that this general method does not permanently remove the desired amount of stretch from the cords.

It is accordingly an object of the present invention to avoid and overcome the above-listed difficulties of prior-known belt structures and methods of building by the provision of an improved, substantially stretchless cord and method of making the same for use in belts or the like.

Another object of the invention is to provide an improved method for economically and satisfactorily producing a flexible strand means of the desired character.

Another object of the invention is to produce an improved belt having a substantially stretchless, but flexible, reinforcing element.

The foregoing and other objects of the invention are achieved by the apparatus now to be described and illustrated in the accompanying drawings wherein:

Fig. 1 is a plan view partly broken away of the apparatus for producing the stretchless flexible strand of the present invention;

Fig. 2 is a side elevation of the apparatus shown in Fig. 1 with the tensioning device removed to permit the wind-up mechanism to be better illustrated;

Fig. 3 is a side elevation of the tensioning and dipping apparatus seen in plan view in Fig. 1;

Fig. 4 is a cross-sectional view through a belt structure employing the improved, non-stretching strands of the present invention;

Fig. 5 is a cross-sectional view taken on line 5—5 of Fig. 1;

Fig. 6 is a side elevation of the air baffle incorporated in the drying chamber seen in Figs. 1 and 2;

Fig. 7 is a side elevation of a fragment of the flexible strand of the present invention.

The present invention is particularly concerned with employing substantially inextensible strand means for reinforced, rubberized belt structures. For example, in the V-type of belt shown in Fig. 4 the belt body 10 is reinforced with one or more elements, loops or layers 12 of flexible strands substantially midway of the upper and lower sides thereof which have substantially no longitudinal stretch but sufficient ultimate strength produced in accordance with the invention. The belt body proper can be made up in any known or desired form so long as the body includes the reinforcing strands or strand. The entire belt body may, if desired, be covered with a cross-woven fabric envelope 16 to complete the assembly. The cords 12 lie substantially midway between the upper and lower faces of the belt at what is termed the neutral axis, that is the position where there is substantially no different compression or tension of the belt during the time the belt is running over a pulley than in the runs thereof. Ordinarily, as the belt travels over the pulley the inner or narrow portion of the belt is compressed while the outer or wide portion of the belt is under tension and is stretched. In between is a neutral axis which is substantially midway between the upper and lower surfaces and it is at this position that I place the cords 12.

While only one particular type of belt has been illustrated specifically, it will be appreciated that the invention is applicable to the manufacture of substantially any form of belt having reinforcing means embedded therein. Thus, flat conveyor belts, driving belts and many others can be improved by the incorporation of the herein-described inextensible, load-carrying structure.

While one broad principle of the invention has been already disclosed, it is part of the inventive concept to provide an improved method and means for treating the flexible cord or strand and one embodiment of suitable apparatus has been shown in the drawings and will now be described.

Referring to Figs. 1 and 2, the numeral 20 indicates generally a dipping and tensioning device with the numerals 22 and 24 indicating generally and respectively a drying chamber and a wind-up mechanism. The tensioning and dipping mechanism 20 is shown in side elevation in Fig. 3 and includes a frame or table 26 having a pair of uprights 28 for removably mounting a spool or drum 30 of cord which has been indicated in strand form by the letter C throughout the drawings. An adjustable tensioning device 32 is provided for holding back the rotation of the cord spools 30.

From the spool 30 the cord C passes through a porcelain eyelet 34 or other suitable means to a dipping tank 36 which contains an aqueous liquid. By an aqueous liquid is meant one which contains water or some other similar agent which truly wets the fabric or cords so that a stretch can be applied to and retained in the same. The liquid may also contain a plastic setting medium such as latex which dries on the cords as they are stretched so that they will be maintained in a stretched condition. The invention further contemplates first wetting and stretching and drying with a subsequent treating with a plastic setting agent such as rubber cement. The cord C is passed through the tank with the aid of rollers 38 positioned at the ends of the tank, and from there passes to a festooning device by way of an air blast in the form of the ring 40 for removing excess treating liquid from the cord. The festooning device includes a drum or sheave 42 journaled on the table 26 through the provision of a bracket 44 which also functions to pivotally support, as at 46, a lever bar 48 which journals a sheave 50. The lever 48 is adapted to be held downwardly through the action of a weight 52 adjustably secured at its upper end to the lever 48. The other end of the lever 48 is preferably provided with a brake shoe 56 which contacts with the wheel 42 to effect a tensioning and braking operation. The festooning device is completed by the provision of sheaves 58 mounted on suitable supports 60 secured to the table 26.

The cord C in leaving the last wheel 58 of the festooning device passes underneath a roller 62 mounted on the arm of an electric switch 64 and functioning to automatically shut off the current to the driving mechanism in case of breakage in the cord.

The cord C after leaving the festooning device and the cutoff switch passes around a sheave 66 set on an angle to the remaining sheaves on the dipping mechanism 20 and from there the cord is passed to the drier as seen in Fig. 1.

The drier, shown generally at 22, comprises an oven-like body 70 mounted upon a suitable frame 72 with a plurality of sheaves 74 and 75 being freely journaled on shafts 76 and 78. The cord C enters the oven 70 through a suitable tube 80 and passes back and forth over the sheaves 74 and 75 in flattened helical form until it is passed out through the oven wall by way of tube 82. Hot air or other drying means is provided in the oven 70 and this may be accomplished by offsetting the sides of the furnace wall 70, as at 86, and separating the offset portions of the oven from the string-containing portions by baffle walls 88 which are formed with a plurality of openings 90 therethrough which function to distribute the hot air supplied to the offset portions by way of pipes 92 and 94.

After leaving the drying oven the cord C passes over a sheave 98, thence under a sheave 100 journaled on a pivoted arm 102 which carries a pointer 104 which is movable over a scale 106 fixed to an extension 108 of the support 72 for the oven 70. A weight 110 functions to hold the arm 102 in tensioning relation with the cord C.

From the sheave 100 the cord C runs over the sheave 116 and thence through an eye 118 formed on the lower end of a guide arm 120 which is pivoted as at 122 upon the frame work 124 of the wind-up device shown generally at 24. The guide arm 120 is provided with a follower 126 which is received in the lever-winding or reverse cam groove 128 of a guiding drum 130 with an additional bar and guide 132 being provided to assist in the proper handling of the guide bar 120. From the guide bar 120 the cord C is led over a drum 140 and thence to a wind-up spool 142 carried between end bearings held in substantially vertical guides.

Means are provided for driving the drum 140 and these means may include a motor 150 operating through a reduction gear 152 to drive the jack shaft 76 by way of sprocket chain 154. A pulley 156 is mounted on the jack shaft 76 and through belt 158 drives pulley 160 mounted on the shaft of the drum 140.

Likewise the lever-winding drum 130 is driven as by providing sprockets 162 and 164 and link chain 166.

It is believed that the operation of the apparatus will be evident from the foregoing description thereof, however a brief summary of the process will now be made.

A spool or drum 30 of cord is applied on the dipping mechanism (shown generally at 20) and the cord is fed down through the dipping tank 36, the air blow 40, the festooning device and into the drying oven where the dipped cord treated, saturated or coated with an aqueous liquid, having a true cord-wetting action, is dried while subjecting the cord to a tension in excess of about 25% of the breaking strength of the cord. The tension may be varied in accordance with the characteristics of the particular cord being operated upon, such variation ranging from the 25% minimum up to approximately 90% maximum. The exact tension on the cord is dependent on the character and position of weight 52 and the tension of means 32 on the cord spool 30.

It will be evident that the drying oven is of sufficient length and capacity to insure the complete drying of the cord while under heavy tension. The oven 70 may be formed with a removable top portion which will permit ready threading of the cord about the aligned sheaves 74 and 75. Likewise any suitable or desired comb device may be incorporated on the oven structure if it is found advantageous in use.

From the drying oven 22 the cord is passed to the scale pulley 100 which permits a reading of the tension on the cord at any time. The cord is then passed to the lever-winding device 120 and the wind-up drum or spool 142. It should be appreciated in this connection that the cord is pulled by the wind-up drum all the way through the entire apparatus including the festoons, drying oven and the like so that the entire length of cord will be maintained under a very high and substantially uniform tension during its travel through the apparatus.

In case the cord C breaks at any time the automatic cut-off switch 64, which carries the roller 62 riding on the taut cord, will open to shut off the current to the motor 150. It will be evident from the foregoing description that treated cords are readily and uniformly produced in which substantially all of the stretch has been permanently removed from the cords by a liquid treating operation with a subsequent drying under controlled tension. The flexible strands so produced are particularly adapted to be employed as reinforcing elements in belts and render the same substantially inextensible.

While in accordance with the patent statutes several forms of applicant's invention have been specifically illustrated and described, it will be appreciated that the scope of the invention is not limited thereto or thereby but is defined in the appended claims.

I claim:

1. That method of making belts which comprises wetting a cord with an aqueous solution of latex, drying the latex on the cord while maintaining the cord at a tension in excess of 25% of its breaking strength, and building the cord into the body of a belt for strengthening purposes.

2. That method of making belts which comprises continuously stretching a cord, continuously wetting the cord with water, continuously drying the cord while maintaining the cord at a tension in excess of 25% of its breaking strength, and building the cord in loops into the body of a belt for strengthening purposes.

3. That method of making belts which comprises stretching a cord, rubberizing the cord, blowing excess rubberizing material from the cord, setting the rubber on the cord while maintaining the cord at a tension of between substantially 20% and 90% of its breaking strength, and building the cord in loops into the body of a belt for strengthening purposes.

4. That method of making stretchless cords which comprises wetting a cord, blowing excess wetting material from the cord, drying the cord while maintaining the cord at a tension of between substantially 20% and 90% of its breaking strength.

5. The process of making a substantially stretchless cord comprising the steps of passing the cord through an aqueous dispersion of latex to penetrate the fibers of the cord completely, stretching the cord in excess of 25% of its breaking strength and maintaining the cord in a stretched condition while subjecting the cord to the action of a drying medium for a time sufficient to thoroughly dry same.

6. The process of making a substantially stretchless cord comprising the steps of passing the cord through an aqueous dispersion of latex to penetrate the fibers of the cord completely, stretching the cord to 25% to 90% of its breaking strength and maintaining the cord in a stretched condition while subjecting the cord to the action of a drying medium for a time sufficient to thoroughly dry same.

ELMER G. KIMMICH.